(12) United States Patent
Miyata et al.

(10) Patent No.: US 9,252,444 B2
(45) Date of Patent: Feb. 2, 2016

(54) FUEL CELL SYSTEM

(75) Inventors: Koichiro Miyata, Saitama (JP); Kentaro Nagoshi, Saitama (JP); Junji Uehara, Saitama (JP); Yuji Matsumoto, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 1701 days.

(21) Appl. No.: 12/552,661

(22) Filed: Sep. 2, 2009

(65) Prior Publication Data
US 2010/0055511 A1    Mar. 4, 2010

(30) Foreign Application Priority Data
Sep. 4, 2008    (JP) ................... 2008-226883

(51) Int. Cl.
*H01M 8/04* (2006.01)
*H01M 8/06* (2006.01)

(52) U.S. Cl.
CPC ............ *H01M 8/0662* (2013.01); *H01M 8/045* (2013.01); *H01M 8/04231* (2013.01); *H01M 8/04365* (2013.01); *H01M 8/04589* (2013.01); *H01M 8/04761* (2013.01); *H01M 2250/20* (2013.01); *Y02E 60/50* (2013.01); *Y02T 90/32* (2013.01)

(58) Field of Classification Search
USPC ................................. 429/429–432
See application file for complete search history.

(56) References Cited

U.S. PATENT DOCUMENTS

2007/0026276 A1 * 2/2007 Ogawa et al. ............. 429/22
2007/0026278 A1 * 2/2007 Wake et al. ............... 429/22

FOREIGN PATENT DOCUMENTS

JP    2006-134806 A    5/2006

* cited by examiner

*Primary Examiner* — Maria J Laios
(74) *Attorney, Agent, or Firm* — Westerman, Hattori, Daniels & Adrian, LLP

(57) ABSTRACT

A fuel cell system calculates amount of fluid discharged from a fuel gas circulation path with water and fuel gas in accordance with an ordinary process map if inside an anode is not scavenged when a fuel cell stops electrochemical reaction; measures amount of water remaining in a fuel gas circulation path in accordance with cumulative electricity output, temperature, or elapsed time after starting the electrochemical reaction if the inside the anode is scavenged previously; and determines whether the inside the fuel gas circulation path is in dry condition or humid condition. The fuel cell system calculates amount of fluid discharged from the fuel gas circulation path with water or the fuel gas in accordance with a map predetermined for the dry condition if the fuel cell system determines that the inside the fuel gas circulation path is in the dry condition. The fuel cell system calculates the amount of the fluid to be discharged with the water or the fuel gas in accordance with the ordinary map if the fuel cell system determines that the inside the fuel gas circulation path is in the humid condition. Accordingly, wasteful discharge of fuel gas can be prevented in a purging operation after starting up the fuel cell system.

7 Claims, 4 Drawing Sheets

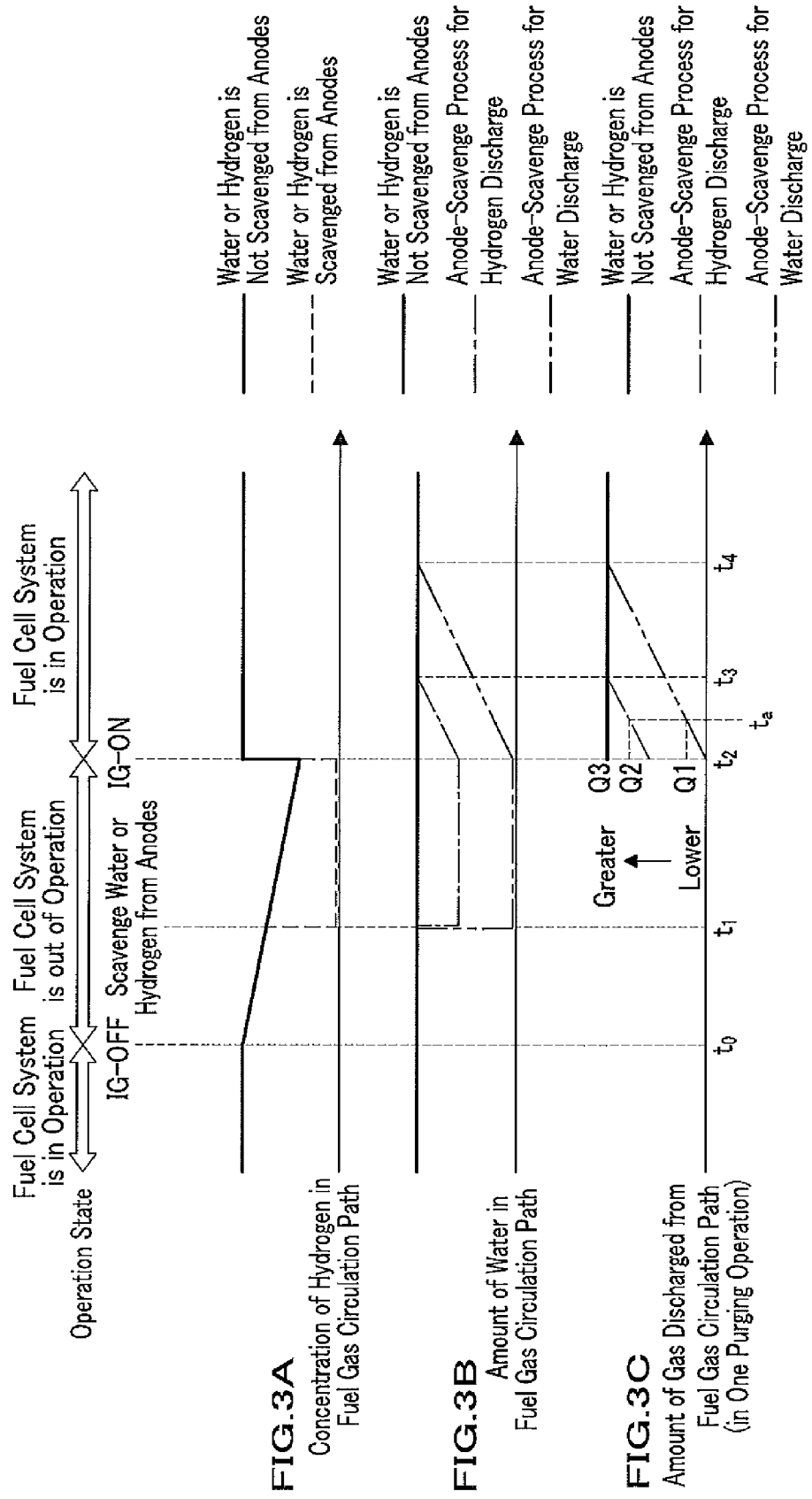

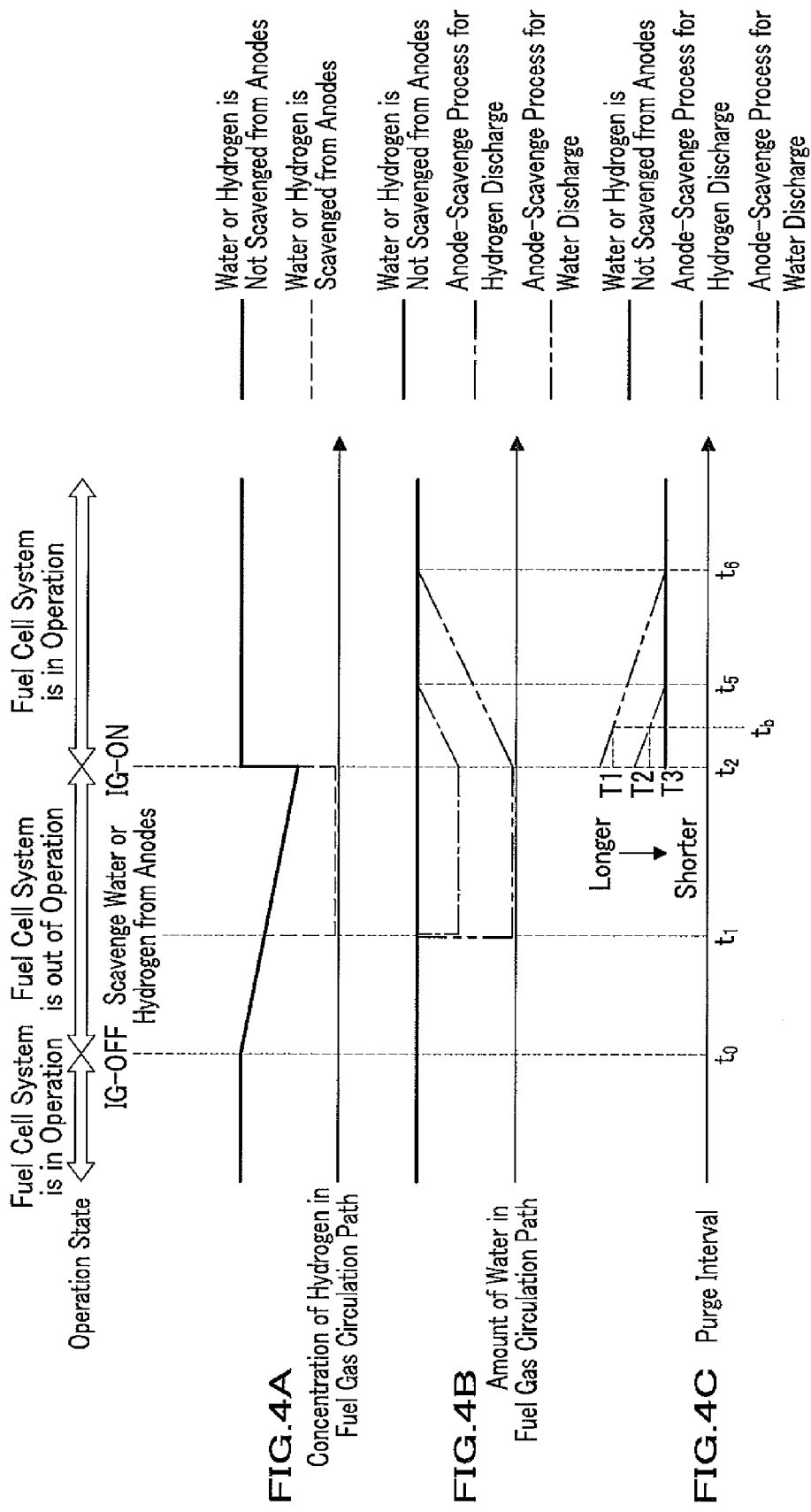

FUEL CELL SYSTEM

CROSS-REFERENCE TO RELATED APPLICATIONS

This application claims the foreign priority benefit under Title 35, United States Code, §119 (a)-(d), of Japanese Patent Application No. 2008-226883, filed on Sep. 4, 2008, in the Japan Patent Office, the disclosure of which is herein incorporated by reference in its entirety.

BACKGROUND OF THE INVENTION

The present invention relates to a fuel cell system having a purge valve for discharging impurities from a fuel gas circulation path.

BACKGROUND ART

Generally, in an attempt to use fuel gas effectively, a fuel cell system mounted on a fuel-cell vehicle or the like adopts a hydrogen circulation path through which hydrogen is supplied as a fuel gas to fuel cells, and the hydrogen unconsumed in the electro-chemical reaction, which is discharged from the fuel cell, is returned to the fuel cell again.

However, a fuel cell system having the hydrogen circulation path of this type has a problem that nitrogen and water permeating from a cathode into the hydrogen circulation path reduce the concentration of hydrogen and lower the power-generating capability; therefore, a purge valve provided in the hydrogen circulation path must be opened to prevent the reduction in the hydrogen concentration. For example, a technique disclosed in paragraph [0027] and FIG. 1 of Japanese Patent Laid-open Publication No. 2006-134806 proposes to calculate an actual amount of hydrogen circulating in a hydrogen circulation path based on the concentration of gas existing in the hydrogen circulation path and to control the amount of circulated hydrogen at required degree by opening a purge valve.

However, the conventional fuel cell system disclosed in the aforementioned Japanese publication has a problem that hydrogen would be discharged sometimes wastefully because the amount of circulated hydrogen is controlled by opening the purge valve.

SUMMARY OF THE INVENTION

The present invention is conceived to solve the aforementioned conventional drawback, and an object thereof is to provide a fuel cell system capable of preventing wasteful discharge of fuel gas in a purging operation after starting up a fuel cell system.

The present invention relates to a fuel cell system including: a fuel cell having an anode and a cathode for conducting electro-chemical reaction, fuel gas being supplied to the anode, and oxidant gas being supplied to the cathode; a fuel gas circulation path for circulating the fuel gas supplied to the anode and supplying the fuel gas to the fuel cell; a purge valve disposed at downstream of the fuel cell in the fuel gas circulation path for opening or shutting off the fuel gas circulation path; a control unit for determining whether inside the fuel gas circulation path is in a dry condition or a humid condition and controlling the purge valve; and a memory device disposed in the control unit for memorizing whether the fuel gas existing in the fuel gas circulation path is replaced or not with air which is different from the fuel gas when the fuel cell stops the electro-chemical reaction, wherein the control unit controls the purge valve in accordance with whether the inside the fuel gas circulation path is in the dry condition or the humid condition and controls an amount of fluid including water and the fuel gas and discharged from the fuel gas circulation path when the control unit confirms whether the fuel gas existing in the fuel gas circulation path is replaced or not with the air in accordance with the memory device after the fuel cell system is started up.

Generally, an amount of water remaining in the fuel gas circulation path is different between an operation conducted after the replacement of the fuel gas with air and an operation which does not conduct such replacement previously. More specifically, since the amount of water remaining in the fuel gas circulation path is lower in the operation conducted after the replacement of the fuel gas with the air than the amount of water remaining in the fuel gas circulation path in the operation which does not conduct such replacement previously, concentration of the fuel gas in the fuel gas circulation path tends to be higher in the operation conducted after such replacement if the amount fluid discharged with water or hydrogen from the fuel gas circulation path is the same between the two cases. In the present invention, the amount of water included in the discharged fluid is decreased in the purging operation if a fewer amount of water remains in the fuel gas circulation path in accordance with the memory device memorizing whether inside the fuel gas circulation path is in the dry condition or the humid condition. That is, the present invention can prevent the concentration of the fuel gas discharged in periodical purging process from increasing after starting up the fuel cell system since the control unit controls the purge valve in such a manner that a fewer amount of fluid is discharged than the amount of discharged fluid in an ordinary state in which the replacement of the fuel gas with the air has not been conducted previously. Therefore, the present invention can prevent wasteful discharge of fuel in a purging operation.

In another aspect of the present invention, the control unit increases the amount of the fluid discharged from the fuel gas circulation path in such a manner that amount of fluid discharged in a fuel-gas-scavenge process is greater than the amount of fluid discharged in a water-scavenge process. In general, the amount of water remaining in the fuel gas circulation path after replacing the fuel gas with air (i.e., for diluting the fuel gas) is greater than the amount of water remaining in the fuel gas circulation path after replacing water with air. In this case, the present invention can prevent decreased concentration of fuel gas, which may be caused by insufficient purge in the fuel gas circulation path in periodical purging process after starting up the fuel cell system and replacing the hydrogen with air, by controlling the amount of fluid discharged with the fuel gas (hydrogen) to be greater than the amount of fluid discharged with water.

In another aspect, the control unit controls duration for opening the purge valve. Accordingly, the present invention can prevent an excessive increase of concentration of the fuel gas discharged from the fuel gas circulation path by reducing the amount of fluid discharged in periodical purging process after starting up the fuel cell system and after replacing the fuel gas with air, to be lower than that of a case not conducting such replacement.

The control unit may control a purge interval between a previous shut-off and a subsequent opening of the purge valve. Accordingly, the present invention can prevent an excessive increase of concentration of the fuel gas discharged from the fuel gas circulation path by extending the purge interval after a replacement of the fuel gas with air longer than the that of a case not conducting replacement.

BRIEF DESCRIPTION OF THE DRAWINGS

FIGS. 3A to 3C are a diagrams each showing concentration of hydrogen and amount of water varying over time while changing the amount of fluid discharged from the fuel gas circulation path.

FIGS. 4A to 4C are diagrams showing concentration of hydrogen and amount of water varying over time while changing purge interval.

DETAILED DESCRIPTION OF THE PREFERRED EMBODIMENTS

The present invention can provide a fuel cell system capable of preventing wasteful discharge of fuel gas included in fluid discharged with water or fuel gas after starting up a fuel cell system.

Technical terms "purge" and "scavenge", hereinafter used for explaining embodiments of the present invention, are defined as follows.

In the present specification, "purge" means discharging water, fuel gas, or mixture of them, from a fuel gas circulation path by introducing fuel gas into the fuel gas circulation path while maintaining an opening state of a purge valve; and "scavenge" means discharging water or fuel gas existing in a flow path including inside a fuel cell by introducing air into the flow path while maintaining an opening state of a purge valve.

Although an embodiment is explained with reference to vehicles including fuel-cell vehicles, the present invention is not limited to fuel cells used in vehicles and can be applied to any other fuel cells used for transportation means including ocean vessels and aircrafts, and for stationary fuel cell systems.

Figure 1:
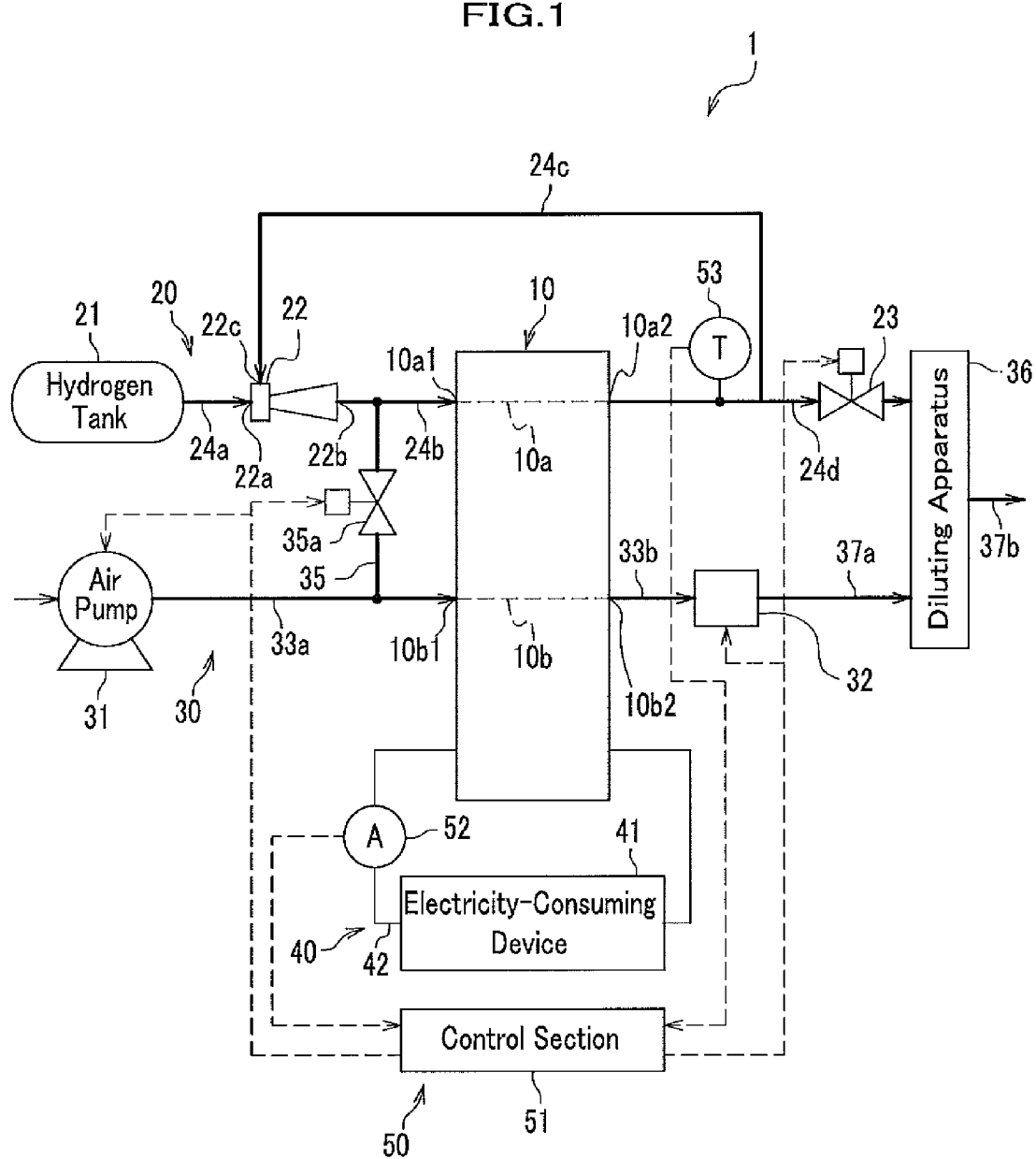
FIG. 1 is a schematic diagram of a fuel cell system according to an embodiment of the present invention.

As shown in FIG. 1, a fuel cell system 1 according to the present embodiment comprises: a fuel cell 10; an anode system 20; a cathode system 30; an electricity-consuming system 40; and a control system 50.

The fuel cell 10 is, for example, a polymer electrolyte fuel cell and has a plurality of single cells stacked and electrically connected in series, each of which has a polymer electrolyte membrane disposed between the anode (fuel electrode) and the cathode (oxygen electrode) and a pair of conductive separators having the polymer electrolyte membrane, the anode, and the cathode therebetween. The separator disposed opposite the anode has an anode flow path 10a through which hydrogen (fuel gas) flows, and the separator disposed opposite the cathode has a cathode flow path 10b for flowing air (oxidant gas) therethrough. Although not shown in the drawing, each separator has a refrigerant flow path for flowing refrigerant therein for cooling the fuel cell 10.

A hydrogen tank 21, an ejector 22, a purge valve 23, and anode gas pipings 24a to 24d constitute the anode system 20.

The hydrogen tank 21 is filled with pressurized highly pure hydrogen and has an electromagnetic shut-off valve which is not shown in the drawing.

The ejector 22 is a circulation pump and has an inlet 22a, an outlet 22b, and a return port 22c. The inlet 22a is connected to the hydrogen tank 21 via the anode gas piping 24a. The outlet 22b is connected to an inlet 10a1 of the anode of the fuel cell 10 via the anode gas piping 24b. The return port 22c is connected to the anode gas piping 24c connected to an outlet 10a2 of the anode of the fuel cell 10. In addition, the ejector 22, having a nozzle which is not shown in the drawing, generates a negative pressure when ejecting hydrogen, supplied by the hydrogen tank 21, from the nozzle. The anode-off-gas supplied from the outlet 10a2 of the fuel cell 10 is sucked into the ejector 22 due to the negative pressure, and then, the anode-off-gas is mixed with fresh hydrogen supplied from the hydrogen tank 21. The mixed gas is supplied to the inlet 10a1 of the fuel cell 10.

The purge valve 23, which may be a magnetic valve, is provided in the anode gas piping 24d at downstream of the fuel cell 10. The anode gas piping 24c branches from the anode gas piping 24d. A control section 51, which is to be explained later, will control the opening and shutting operation of the purge valve 23. Incidentally, as explained later, the concentration of hydrogen in the fuel gas circulation path is reduced by nitrogen; or water, moisture, or vapor (hereinafter simply called water) permeated from the cathode, while the fuel cell system 1 is in operation, and the reduced concentration of hydrogen reduces the power-generating capability. The present invention can prevent such reduction of the power-generating capability by conducting a periodical purging process in which the purge valve 23 is opened periodically.

Although not shown in the drawing, a pressure-reducing valve for appropriately reducing the pressure of highly pressurized hydrogen supplied from the hydrogen tank 21 to a predetermined pressure is provided in the anode gas piping 24a disposed between the hydrogen tank 21 and the ejector 22. In the present embodiment, the fuel gas circulation path includes the anode gas pipings 24b and 24c, and the anode flow path 10a formed in the fuel cell 10.

The cathode system 30 includes an air pump 31, a back-pressure-regulating valve 32, and cathode gas pipings 33a and 33b.

The air pump 31 is, for example, a motor-driven supercharger for compressing air taken from thereoutside and supplying the compressed air to the cathode of the fuel cell 10. The control section 51 controls the motor rotation speed of the air pump 31.

The back-pressure-regulating valve 32, which may be a butterfly valve having adjustable opening degree, is connected to an outlet 10b2 of the cathode of the fuel cell 10 through the cathode gas piping 33b. The back-pressure-regulating valve 32 adjusts the pressure of air applied to the cathode of the fuel cell 10. The control section 51 controls the opening degree of the back-pressure-regulating valve 32.

Although not shown in the drawing, a humidifier for humidifying the compressed air supplied from the air pump 31 is disposed in the cathode gas piping 33a which connects the air pump 31 to an inlet 10b1 of the cathode of the fuel cell 10. The humidifier, which is also connected with the cathode gas piping 33b, humidifies the air supplied by the air pump 31 with cathode-off-gas discharged from the outlet 10b2 of the cathode of the fuel cell 10.

The fuel cell system 1 according to the present embodiment further includes an air introduction piping 35 having an air introduction valve 35a; and a diluting apparatus 36.

Scavenging gas, which is different from hydrogen (fuel gas), is introduced first into the air introduction piping 35, and then introduced into the fuel gas circulation path including the anode flow path 10a and the anode gas pipings 24b and 24c. An end of the air introduction piping 35 in the vicinity of the cathode is connected to the cathode gas piping 33a disposed between the air pump 31 and the humidifier. Another end of the air introduction piping 35 in the vicinity of the anode is connected to the anode gas piping 24b disposed between the ejector 22 and the inlet 10a1 of the fuel cell 10. The control section 51 controls opening and shutting-off operation of the air introduction valve 35a which is, for example, an electromagnetic shut-off valve.

The diluting apparatus 36 has a function of diluting the hydrogen included in the anode-off-gas discharged through from the purge valve 23 and discharging the diluted gas to thereoutside. The diluting apparatus 36 is connected with the back-pressure-regulating valve 32 through an discharge piping 37a, and communicates with thereoutside (the exterior of a vehicle) through an discharge piping 37b.

The electricity-consuming system 40 includes an electricity-consuming device 41 connected with the fuel cell 10 through a connection cable 42. The air pump 31, a driving motor (not shown in the drawing), and a high-voltage battery (not shown in the drawing) constitute the electricity-consuming device 41. The fuel cell 10 is connected to the electricity-consuming device 41 through a contactor which is not shown in the drawing.

The control section 51, an ammeter 52, and a thermometer 53 constitute the control system 50.

The control section 51 has: a central processing unit (CPU); a random access memory (RAM); a read only memory (ROM) having programs implemented therein; an input/output interface circuit; a recording unit; a unit for determining dry-or-humid condition; and a control unit. The recording unit controls the RAM to memorize whether the fuel gas or water remaining in the fuel gas circulation path is replaced or not with air after turning off an ignition switch to stop the electrochemical reaction in the fuel cell 10 and until turning on the ignition switch to start up the fuel cell system 1 later. The unit for determining dry-or-humid condition determines whether the inside the fuel gas circulation path is in the dry condition or the humid condition based on cumulative electricity output, power-generating time, or temperature etc. of the fuel cell 10. The control unit selects one of dry-condition-purging process (set for fewer amount of water remaining in a scavenged anode) and humid-condition-purging process (set for plenty of water remaining in a non-scavenged anode) in accordance with the dry or humid condition in the fuel gas circulation path, and then, controls the purge valve 23 based on the selected result.

The ammeter 52 measures, for example, electric current supplied from the fuel cell 10 and consumed by the electricity-consuming device 41; calculates cumulative electric current in accordance with the measured electric current; and estimates the amount of water produced in the fuel gas circulation path. It should be determined that the amount of water produced in the fuel cell 10 has increased if the cumulative electric current has increased. The present invention is not limited to use the cumulative electric current and may use cumulative electric power.

The thermometer 53 may be used for determining the amount of the produced water. The thermometer 53 is disposed in the anode gas piping 24c connected to the outlet 10a2 of the anode of the fuel cell 10. It should be determined that the amount of water produced in the fuel cell 10 has increased if the temperature measured by the thermometer 53 has increased. Alternatively, the amount of water may be determined not only based on the cumulative electric current or the temperature of the fuel cell 10 but also based on time after starting up the fuel cell system 1 (after starting the electrochemical reaction in the fuel cell 10). A timer for measuring such elapsed time may be disposed in the control section 51. It should be determined that the amount of water produced in the fuel cell 10 has increased if the elapsed time is longer.

Hereinafter, operations of the fuel cell system 1 according to the present embodiment will be explained with reference to FIGS. 1 to 3C. When the ignition switch of the currently started up fuel cell system 1 is turned off, the control section 51 shuts off the shut-off valve provided in the hydrogen tank 21 to stop hydrogen from being supplied to the anode of the fuel cell 10; and stops the air pump 31 from supplying air to the cathode of the fuel cell 10. The control section 51 shuts off the connection provided by contactor between the fuel cell 10 and the electricity-consuming device 41 to stop the electrochemical reaction in the fuel cell 10.

Immediately after the fuel cell 10 stops electrochemical reaction, or while the fuel cell system 1 is out of operation, if the control section 51 determines that water remaining in the fuel cell 10 will be frozen, the control section 51 conducts a scavenging process for discharging water away from flow-paths including the inside the fuel cell 10. The aforementioned scavenging process is conducted when the system temperature measured by the thermometer 53 becomes equal to or lower than predetermined temperature. The system temperature is not limited to the temperature of the anode system 20 and may be temperature of the cathode system 30, temperature of a cooling system for cooling the fuel cell 10, or temperature of open air. In place of temperature, weather information obtained by a navigation system may be used for determining whether the water in the fuel gas circulation path increases or not.

In the aforementioned scavenging process, the air pump 31 driven by means of electricity supplied from, for example, a high-voltage rechargeable device (lithium-ion secondary battery, capacitor) and not shown in the drawings supplies a large volume of air to the cathode of the fuel cell 10 when the control section 51 opens the back-pressure-regulating valve 32 fully, opens the purge valve 23 appropriately, and opens the air introduction valve 35a. Accordingly, the air supplied from the air pump 31 flows through the cathode gas piping 33a, the cathode flow path 10b in the fuel cell 10, and the cathode gas piping 33b while blowing the water remaining in these pipings, and then, the air is introduced into the diluting apparatus 36 through the discharge piping 37a (hereinafter called cathode-scavenge). Part of the air supplied from the air pump 31 and passing through the air introduction piping 35, the fuel gas circulation path, and the anode gas piping 24d is discharged from through the purge valve 23; therefore, the discharged air dilutes the hydrogen remaining in the fuel gas circulation path. The hydrogen discharged from through the purge valve 23 and introduced into the diluting apparatus 36 is diluted by the air discharged from the cathode of the fuel cell 10, and then discharged to the outside of the vehicle (hereinafter called anode-scavenge process for hydrogen discharge).

The control section 51 controls the air pump 31 for supplying a large volume of air by shutting off the back-pressure-regulating valve 32 and opening the purge valve 23. The air supplied from the air pump 31 flows through the air introduction piping 35, the fuel gas circulation path, and the anode gas piping 24d while blowing the water remaining in these pipings, and is discharged through the purge valve 23 to the diluting apparatus 36 (hereinafter called anode-scavenge process for water discharge).

If the water or hydrogen is scavenged from the anode, the recording unit (RAM) memorizes a flag which indicates that the water or the hydrogen has been scavenged from the anode; and if water or hydrogen is not scavenged from the anode, the recording unit memorizes a flag which indicates that neither water nor the hydrogen has been scavenged from the anode.

Figure 2:
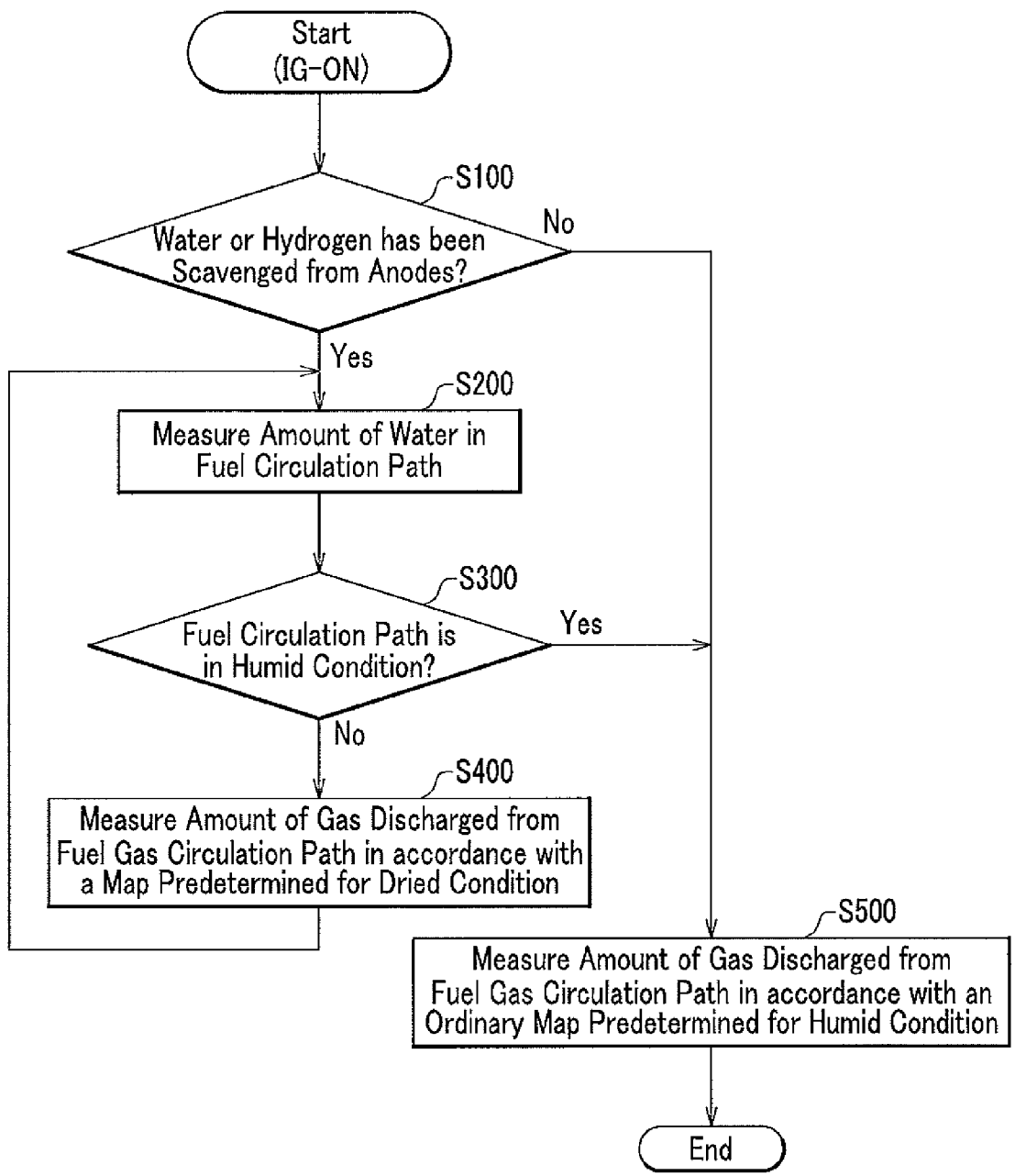
FIG. 2 shows a flowchart of controlling purging processes.

As shown in FIG. 2, when the ignition switch is turned on (IG-ON), the control section 51 opens the shut-off valve provided in the hydrogen tank 21 to start supplying hydrogen to the anode of the fuel cell 10 and drives the air pump 31 to start supplying air to the cathode of the fuel cell 10. The concentration of hydrogen increases in this state of the anode. After voltage reaches predetermined open circuit voltage (OCV) of the fuel cell 10, and when the control section 51 connects the fuel cell 10 to the electricity-consuming device 41 by using the contactor, and the fuel cell 10 starts electrochemical reaction.

In step S100, the control section 51 determines which of the anode-scavenge process for hydrogen discharge and the anode-scavenge process for water discharge has been conducted while the fuel cell system 1 is out of operation between the times IG-OFF and IG-ON. In the step S100, if the control section 51 refers to a flag recorded in the recording unit and determines the hydrogen or the water has not been scavenged from the anode (No in step S100), more specifically, if a flag memorized in the recording unit indicates that neither hydrogen nor water is scavenged from the anode, the process proceeds to step S500, and then, the control section 51 calculates the amount of fluid to be discharged from the fuel gas circulation path in accordance with an ordinary map predetermined for humid condition which indicates that neither hydrogen nor water has been scavenged from the anode. The control section 51 sets a duration for opening the purge valve 23 while maintaining a fixed purge interval, or sets a purge interval between a previous shut-off and a subsequent opening of the purge valve 23 while maintaining a fixed duration for opening the purge valve 23 in accordance with the calculated amount of the fluid, and then, conducts a periodical purging process in the started-up fuel cell 10. It should be noted that, in order to prevent hydrogen from being discharged in an excessive concentration to the outside of the vehicle, the duration for having the purge valve 23 opened or the purge interval for the purge valve 23 should be determined based on previously-conducted experiments.

On the other hand, in the step S100, if the control section 51 determines that hydrogen or water has been scavenged from the anode (Yes in step S100), more specifically, if the recording unit stores information that hydrogen or water has been replaced with a scavenging gas (air), the process proceeds to step S200, and then, the control section 51 estimates the amount of water remaining in the fuel gas circulation path of the anode system 20. As previously explained, the amount of water in this state can be determined based on cumulative electricity output, temperature of the fuel cell 10, or elapsed time after starting the electro-chemical reaction. It should be noted that the amount of water remaining in the fuel gas circulation path is dependent on how much water is produced in the cathode of the fuel cell 10 and permeates through the polymer electrolyte membrane to the anode.

In step S300, the control section 51 determines whether the inside the fuel gas circulation path is in a dry condition or a humid condition (by means of a dry/humid-condition-determining unit). It should be determined that the fuel gas circulation path is in the humid condition if at least one of the following conditions is satisfied that: the cumulative amount of the generated electricity is equal to or greater than that has been generated; the temperature is equal to or higher than a predetermined temperature; and the power-generating time lasts for a predetermined duration or longer. If the control section 51 determines that the inside the fuel gas circulation path is in the dry condition (No in step S300), for example, that the cumulative electricity output is lower than a predetermined output, the process proceeds to step S400.

In the step S400, the control section 51 calculates the amount of the fluid to be discharged from the fuel gas circulation path in accordance with a map predetermined for the dry condition in which hydrogen or water has been scavenged from the anode. More specifically, the dry condition means that: fewer water remains in the fuel gas circulation path; water does not prevent the discharging of the hydrogen from the started-up fuel cell 10 in the periodical purging process; and therefore, hydrogen can be discharged from the fuel gas circulation path easily. The amount of fluid to be discharged in the periodical purging process may be corrected by varying the valve-opening time for the purge valve 23 or by varying the purge interval between a previous shut-off and a subsequent opening of the purge valve 23 in the step S400 in accordance with whether the fuel gas circulation path is in the dry condition or the humid condition, since the condition in the fuel gas circulation path may change from the dry condition to the humid condition if the cumulative electricity output increases after starting the electrochemical reaction in the fuel cell; if temperature of the fuel cell increases; or if more time elapses after starting the electrochemical reaction.

As previously explained, in the step S400, an initial value of the amount of the fluid discharged during the periodical purging process may be set appropriately in accordance with the map predetermined for the anode-scavenge process for hydrogen discharge or the map predetermined for the anode-scavenge process for water discharge, since the amount of water scavenged from the anode differs between the anode-scavenge process for hydrogen discharge and the anode-scavenge process for water discharge. That is, the amount of fluid discharged in the anode-scavenge process for hydrogen discharge may be set greater than the amount of fluid discharged in the anode-scavenge process for water discharge since the amount of water scavenged from the fuel gas circulation path in the anode-scavenge process for hydrogen discharge is lower than the amount of water scavenged from the fuel gas circulation path in the anode-scavenge process for water discharge. For example, the anode-scavenge process for hydrogen discharge in the periodical purging process may be set to have a longer duration for opening the purge valve 23 or a shorter purge interval.

The control section 51 opens the purge valve 23 for the duration corresponding to the amount of the fluid calculated in the step S400. Accordingly, the hydrogen discharged from the purge valve 23 and introduced into the diluting apparatus 36 is diluted to a predetermined concentration or lower by the cathode-off-gas discharged from the fuel cell 10, and then discharged to the outside of the vehicle.

Subsequently, the control section 51 repeats the steps from S200 to S400, and the process proceeds to step S500 if the control section 51 determines that the fuel gas circulation path is in the humid condition (Yes in step S300). The control section 51 conducts the periodical purging process after changing from the map predetermined for the dry condition to an ordinary map predetermined for the humid condition.

As shown in diagrams in FIGS. 3A to 3C, the concentration of hydrogen and the amount of water existing in the fuel gas circulation path are high until time $t_0$ comes while the fuel cell system 1 is in operation. When the ignition switch is turned off at the time $t_0$, the hydrogen in the anode permeates through the polymer electrolyte membrane and moves to the cathode, and then the hydrogen is discharged to the outside of the vehicle through the cathode gas pipings 33a and 33b and the discharge pipings 37a and 37b and is dispersed into the atmosphere. Accordingly, the concentration of the hydrogen is reduced gradually in the fuel gas circulation path. The decreased concentration of the hydrogen can be explained by not only a fact that the hydrogen existing in the anode leaks to the cathode but also another fact that the concentration of the hydrogen may be reduced if the hydrogen remaining in the anode reacts with the oxygen existing in the air remaining in the cathode, or if a discharge resistance is connected to the fuel cell 10.

When the water or hydrogen in the fuel gas circulation path is replaced with air and scavenged from the anode at time $t_1$, the concentration of the hydrogen in the fuel gas circulation path is reduced rapidly as shown in a dotted line shown in FIG. 3A. As shown with a long dashed double-dotted line in FIG. 3B, the amount of water existing in the fuel gas circulation path is reduced to a great extent if the control section 51 conducts the anode-scavenge process for water discharge at the time $t_1$; and as shown with a long dashed dotted line in FIG. 3B, if the control section 51 conducts the anode-scavenge process for hydrogen discharge, the amount of water existing in the fuel gas circulation path is reduced to the middle of the solid line which shows the humid condition and the long dashed double-dotted line which shows that the water is scavenged from the anode.

When the ignition switch is turned on at time $t_2$ (IG-ON), the concentration of the hydrogen increases in the fuel gas circulation path since the hydrogen tank 21 starts supplying the hydrogen again. When the concentration of the hydrogen increases at time $t_2$, and when the OCV of the fuel cell 10 reaches the predetermined voltage in accordance with the reaction between the hydrogen and the oxygen in the air in the cathode, the fuel cell 10 starts electro-chemical reaction if the control section 51 connects the fuel cell 10 to the electricity-consuming device (external load) 41 by means of the contactor. In addition, when the ignition switch is turned on at time $t_2$ (IG-ON), the amount of water increases in the fuel gas circulation path gradually since the water produced by the electrochemical reaction between the hydrogen and the oxygen in the cathode permeates to the anode.

As shown with the long dashed double-dotted line and the long dashed dotted line in FIG. 3C, the amount of fluid discharged with fuel gas and water in one purging operation increases gradually since the amount of water increases in the fuel gas circulation path when the fuel cell 10 starts electro-chemical reaction (IG-ON). The control section 51 controls the amount of the fluid discharged with fuel gas and water by varying the duration for opening the purge valve 23. The amount of fluid discharged with fuel gas and water may be controlled by using a purge valve having a variable opening degree.

For example, in periodical purging process conducted at time $t_a$ after starting electro-chemical reaction in the fuel cell 10, Q1 indicates the amount of the fluid discharged with fuel gas and water from the anode in one purging operation if the anode-scavenge process for water discharge has already been conducted, and Q2 indicates the amount of gas, which is greater than Q1, discharged with fuel gas and water from the anode in one purging operation if the anode-scavenge process for hydrogen discharge has already been conducted. Anode-scavenge process for hydrogen discharge in the periodical purging process on or after time $t_3$ is conducted by the amount Q3 of the discharged fluid set for the humid condition, and after that, the periodical purging process is maintained by the amount Q3. Anode-scavenge process for water discharge in the periodical purging process on or after time $t_4$ is conducted with the amount Q3 which is set for the humid condition, and after that, the periodical purging process is maintained with the amount Q3.

Explanation regarding a purging operation hereinafter is based on assumptions that: the ratio of hydrogen:nitrogen:water is 8:2:5 in the fuel gas circulation path in humid condition if neither water nor hydrogen is scavenged from the anode (the fuel gas is not replaced with the air); the ratio of hydrogen:nitrogen is 8:2 in the fuel gas circulation path in dry condition if the fuel gas remaining in the anode is scavenged; and 20% of hydrogen (included in fuel gas or anode-off gas) is replaced with (diluted by) nitrogen permeated from the cathode. In this case, in order to discharge 2 liter of nitrogen to the outside of the fuel cell system 1 in one purging operation, 15 liter of fluid (including 8 liter of hydrogen, 2 liter of nitrogen, and 5 liter of water) is necessary if the fuel gas circulation path is in the humid condition; and 10 liter of fluid (including 8 liter of hydrogen and 2 liter of nitrogen) is necessary if the fuel gas circulation path is in the dry condition. If a purging operation is conducted in accordance with the ordinary map predetermined for the humid condition even though the fuel gas circulation path is actually in the dry condition, an excessive amount of hydrogen will be discharged to the outside of the fuel cell system 1 and the concentration of hydrogen included in the discharged fluid will increase excessively since 12 liter of hydrogen and 3 liter of nitrogen, 15 liter in total, are discharged. Conversely, if a purging operation is conducted in accordance with the map predetermined for the dry condition even though the fuel gas circulation path is actually in the humid condition, electrochemical reaction in the fuel cell 10 may become unstable since nitrogen cannot be discharged sufficiently because nitrogen merely occupies 1.3 liter; hydrogen occupies 5.4 liter; and water occupies 3.3 liter in 10 liter of the discharged fluid.

Therefore, the fuel cell system according to the present embodiment can prevent an excessive increase of the concentration of hydrogen discharged to the outside of the vehicle, since the control section 51 reduces the amount of fluid including water and fuel and discharged in one time of purging operation by setting the duration for opening the purge valve 23 in the periodical purging process in the dry condition to be shorter than the duration for opening the purge valve 23 in the periodical purging process in the humid condition. Therefore, the present invention can prevent wasteful discharge of hydrogen in one purging operation.

The present embodiment can conduct a purging operation more effectively by correcting the amount of the fluid discharged with water and fuel gas (initial value at time $t_2$) based on whether the purging operation is conducted in accordance with the anode-scavenge process for hydrogen discharge or the anode-scavenge process for water discharge. That is, the present invention can prevent insufficient discharge of nitrogen from the fuel gas circulation path by setting the amount of the fluid discharged in the anode-scavenge process for hydrogen discharge to be greater than the amount of fluid set in consideration of a previously-conducted anode-scavenge process for water discharge. Conversely, the present invention can prevent hydrogen from being discharged in excessively higher concentration from the fuel gas circulation path by setting the amount of fluid discharged with water in the anode-scavenge process for water discharge to be lower than the amount of the fluid discharged with hydrogen in the anode-scavenge process for hydrogen discharge.

Although the duration for opening the purge valve 23 is changed in the aforementioned embodiment, the present invention is not limited to this configuration. As shown in FIG. 4C, a purge interval between a previous shut-off and a subsequent opening of the purge valve 23 may be controlled. FIGS. 4A and 4B showing the same as those shown in FIGS. 3A and 3B are omitted in the following explanation.

As shown with a long dashed dotted line and a long dashed double-dotted line in FIG. 4C, the purge interval is set to become shorter gradually since the amount of water will increase in the fuel gas circulation path when the fuel cell 10 starts electrochemical reaction at time $t_2$ (IG-ON). A purge interval is set to T1 if the anode-scavenge process for water discharge has been conducted prior to conducting a periodical purging process at time $t_b$ and after starting the electrochemical reaction in the fuel cell 10. That is, the present invention can prevent discharge of hydrogen in an excessively higher concentration since the purge interval is set to be longer, and since a next purging operation is conducted after hydrogen is diluted sufficiently in the diluting apparatus 36. Alternatively, a purge interval is set to T2 which is shorter than the purge interval T1 if the anode-scavenge process for hydrogen discharge has been conducted prior to conducting a periodical purging process at time $t_b$ and after starting the electrochemical reaction in the fuel cell 10. The purge interval at or after time $t_5$ set for the anode-scavenge process for hydrogen discharge is maintained at T3. If the anode-scavenge process for water discharge is conducted later than time t6, a purge interval is set to T3 which is shorter than the purge interval T2.

Accordingly, similarly to the embodiment for controlling the duration for opening the purge valve 23, the present invention can prevent discharge of hydrogen to the outside of the vehicle in an excessive increase of the concentration since the present embodiment controls the purge interval in the dry condition to be longer than that in the humid condition. Therefore, the present invention can prevent unnecessary discharge of hydrogen in a purging operation.

In addition, in the embodiment for controlling the purge interval, it is possible to conduct further effective purging operation since the initial value of the purge interval (the purge interval at time $t_2$) can be adjusted in accordance with whether the purging operation is conducted in the anode-scavenge process for water discharge or the anode-scavenge process for hydrogen discharge. That is, the present invention can prevent a problem of unnecessary discharge of hydrogen in an excessive concentration, since the purge interval for the anode-scavenge process for water discharge can be set to be longer than the purge interval set for the anode-scavenge process for hydrogen discharge if the anode-scavenge process for water discharge has been previously conducted, and since a next purging operation is conducted after diluting hydrogen in the diluting apparatus 36 sufficiently. Conversely, if the anode-scavenge process for hydrogen discharge has been conducted previously, the present invention can prevent shortage of hydrogen in the fuel gas circulation path by setting the purge interval after the anode-scavenge process for hydrogen discharge to be longer than that of the humid condition.

In the aforementioned embodiments, the amount of the fluid discharged with water or fuel gas increases in a linear manner as shown in the diagrams of FIGS. 3B and 3C, and the purge interval decreases in a linear manner as shown in the diagram of FIG. 4C. However, the present invention is not limited to these embodiments. That is, in the present invention, an amount of the discharged fluid or purge interval may be controlled stepwise.

What is claimed is:

1. A fuel cell system, comprising:
a fuel cell having an anode and a cathode configured to conduct electro-chemical reaction, fuel gas being supplied to the anode, and oxidant gas being supplied to the cathode;
a fuel gas circulation path configured to circulate the fuel gas supplied to the anode and supply the fuel gas to the fuel cell;
a purge valve disposed at downstream of the fuel cell in the fuel gas circulation path configured to open or shut off the fuel gas circulation path;
a control unit configured to determine whether inside the fuel gas circulation path is in a dry condition or a humid condition and controlling the purge valve; and
a memory device disposed in the control unit configured to memorize a value in said memory device to indicate whether the fuel gas existing in the fuel gas circulation path is replaced or not with air which is different from the fuel gas when the fuel cell stops the electro-chemical reaction, wherein
after the fuel cell system is started up, the control unit configured to control the purge valve in such a manner that an amount of fluid gas discharged from the fuel gas circulation path when the value memorized in said memory device indicates that the replacement of the fuel gas with the air has been conducted and the inside of the fuel gas circulation path is in the dry condition is less than the amount of fluid gas discharged from the fuel gas circulation path when the value memorized in said memory device indicates that the replacement of the fuel gas with the air has not been conducted.

2. The fuel cell system as in claim 1, wherein the control unit configured to increase the amount of the fluid discharged from the fuel gas circulation path in such a manner that amount of fluid discharged in a fuel-gas-scavenge process is greater than the amount of fluid discharged in a water-scavenge process.

3. The fuel cell system as in claim 1, wherein the control unit configured to control duration for opening the purge valve.

4. The fuel cell system as in claim 1, wherein the control unit configured to control a purge interval between a previous shut-off and a subsequent opening of the purge valve.

5. The fuel cell system as in claim 1, further comprising an ammeter for measuring a value of electric current produced by the fuel cell, wherein the control unit configured to determine whether the inside the fuel gas circulation path is in the dry condition or the humid condition in accordance with the value of electric current measured by the ammeter.

6. The fuel cell system as in claim 1, further comprising a thermometer for measuring temperature of the fuel cell, wherein the control unit configured to determine whether the inside the fuel gas circulation path is in the dry condition or the humid condition in accordance with the temperature measured by the thermometer.

7. A method for controlling a fuel cell system,
wherein the fuel cell system comprises:
a fuel cell having an anode and a cathode for conducting electro-chemical reaction, fuel gas being supplied to the anode, and oxidant gas being supplied to the cathode;
a fuel gas circulation path for circulating the fuel gas supplied to the anode and supplying the fuel gas to the fuel cell;
a purge valve disposed at downstream of the fuel cell in the fuel gas circulation path for opening or shutting off the fuel gas circulation path;
a control unit for determining whether inside the fuel gas circulation path is in dry condition or humid condition and controlling the purge valve; and
a memory device disposed in the control unit for memorizing a value that indicates whether the fuel gas existing in the fuel gas circulation path is replaced or not with air which is different from the fuel gas when the fuel cell stops the electro-chemical reaction, wherein
the method conducted by the control unit comprises the steps of:
after the fuel cell system is started up, controlling the purge valve in such a manner that an amount of fluid gas discharged from the fuel gas circulation path when the value memorized in said memory device indicates that the replacement of the fuel gas with the air has been conducted and the inside of the fuel gas circulation path is in the dry condition is less than the amount of fluid gas discharged from the fuel gas circulation path when the value memorized in said memory device indicates that the replacement of the fuel gas with the air has not been conducted.

* * * * *